United States Patent [19]
Baba

[11] Patent Number: 5,024,125
[45] Date of Patent: Jun. 18, 1991

[54] SHIFT CONTROL SYSTEM FOR AN AUTOMATIC TRANSMISSION

[75] Inventor: Fumiaki Baba, Hiroshima, Japan

[73] Assignee: Mazda Motor Corporation, Hiroshima, Japan

[21] Appl. No.: 505,608

[22] Filed: Apr. 6, 1990

[30] Foreign Application Priority Data

Apr. 7, 1989 [JP] Japan .................................. 1-86993

[51] Int. Cl.$^5$ .............................................. B60K 41/06
[52] U.S. Cl. .................................................... 74/866
[58] Field of Search ................. 74/856, 860, 861, 866, 74/867, 868, 869

[56] References Cited

U.S. PATENT DOCUMENTS

| | | | |
|---|---|---|---|
| 4,262,335 | 4/1981 | Ahlen et al. | 74/866 X |
| 4,524,645 | 6/1985 | Tatsami | 74/861 X |
| 4,790,215 | 12/1988 | Hamano | 74/866 |
| 4,823,267 | 4/1989 | Kumara | 74/866 X |
| 4,947,330 | 8/1990 | Hiramatsu | 74/866 X |
| 4,958,492 | 9/1990 | Maki et al. | 74/866 X |

Primary Examiner—Dwight Diehl
Attorney, Agent, or Firm—Fish & Richardson

[57] ABSTRACT

A shift control system for the vehicle contains a torque-converter, a multiple stage gear mechanism adapted for a shift of an operating state of a friction coupling means of a hydraulic pressure type which is coupled to the torque converter, a temperature sensor for sensing temperatures of the operating oil for the torque converter and the friction coupling element, and a control unit for shift control. The control unit controls operation of the friction coupling elements on the basis of a predetermined shift characteristic and shifts the shift characteristic, when the temperature of the operating oil to be sensed by the temperature sensor is lower than a given value, is in such a manner that the area of driving at least for first speed stage is narrowed.

25 Claims, 7 Drawing Sheets

SHIFT CONTROL SYSTEM FOR AN AUTOMATIC TRANSMISSION

BACKGROUND OF THE INVENTION

1. Field of the Invention

The present invention relates to a shift control system for an automatic transmission.

2. Description of Related Art

Many kinds of automatic transmissions comprise a torque converter and a multiple stage shift gear mechanism coupled to the torque converter. The multiple stage gear mechanism performs a shift by shifting operational states of friction coupling elements such as clutches and brakes mounted thereto. Shifting the operational states of the friction coupling elements is performed on the basis of a predetermined shift characteristic which is set generally using a vehicle speed and an engine load as parameters.

When the engine is cold, a driving state of the engine may not be rendered stable, so that Japanese Patent Examined Publication No. 32,941/1980 proposes that the shift characteristic be transferred to the high speed side during a so-called cold time period when the temperature of an operating oil is below a given value. Hence, it is proposed that a driving range be widened, in which the driving is performed at a low speed stage over the cold time period.

It is significant from the viewpoint of a prevention of shift shock, too, how to set the line pressure of the operating oil for the friction coupling elements. Therefore, generally speaking, for instance, the line pressure is subjected to duty control, while the duty ratio for the duty control is corrected in accordance with the oil pressure.

During the cold time when the oil is below the freezing point, the viscosity of the operating oil may vary to a greater extent, as compared with an ambient atmosphere where the operating is not cold, so that it may be impossible to control the line pressure to a desired magnitude with the aid of the duty control even if the duty ratio would be corrected. When the line pressure is controlled by the process other than the line pressure control, an increase in the viscosity of the operating oil may change a timing for shifting, thereby worsening the shock of a shift. Therefore, it is important to raise the temperature of the operating oil and depart from a cold state as soon as possible in order to prevent the shock of the shift.

SUMMARY OF THE INVENTION

Therefore, the present invention has the object to provide a shift control system of an automatic transmission adapted to raise the temperature of the operating oil for the automatic transmission within the shortest possible time period.

In order to achieve the object, the shift control system according to the present invention has the construction, as schematically shown in FIG. 10, which comprises:

a torque converter;

a multiple stage gear mechanism for performing a shift by shifting an operational state of a friction coupling element of a hydraulic pressure type, which is coupled to the torque converter;

a shift control means for controlling operation of the friction coupling element on the basis of a predetermined shift characteristic;

a temperature detecting means for detecting a temperature of an operating oil for the torque converter and the friction coupling element; and a shift characteristic shifting means for shifting the shift characteristic so as to make a driving range at least at first speed stage narrow during cold time when the temperature of the operating oil detected by the temperature detecting means is equal to or lower than a predetermined value.

With the above arrangement, the driving range at least at a speed as low as first speed stage is narrowed over the cold time period when the oil temperature of the operating oil is below a given value, the vehicle is driven at a speed stage higher than in the driving state in which the vehicle is otherwise driven originally at first speed stage. This means that a slip of the torque converter becomes large and workload to be applied to the operating oil increases, thereby smoothly raising the oil temperature of the operating oil.

It is preferred that the operation of the friction coupling elements is ensured by raising the line pressure during the cold time when the operting oil is cold. In this case, it is disadvantageous from the viewpoint of a prevention of the shock of a shift merely in terms of enlarging the line pressure. The present invention, however, can reduce the opportunity to the least possible level, in which the shock of a shift matters even if the line pressure would be raised during the cold time period, because the range of driving at a low speed stage, particularly at first speed stage, is narrowed, at which the shock of the shift may particularly cause problems.

In order to narrow the range of driving at first speed stage, it is possible that, extremely speaking, driving may not be performed at all at first speed stage.

Other objects, features and advantages of the present invention will become apparent in the course of the description of the preferred embodiments which follows in conjunction with the accompanying drawings.

DESCRIPTION OF THE PREFERRED EMBODIMENTS

The present invention will be described more in detail by way of examples in conjunction with the accompanying drawings.

Figure 1:
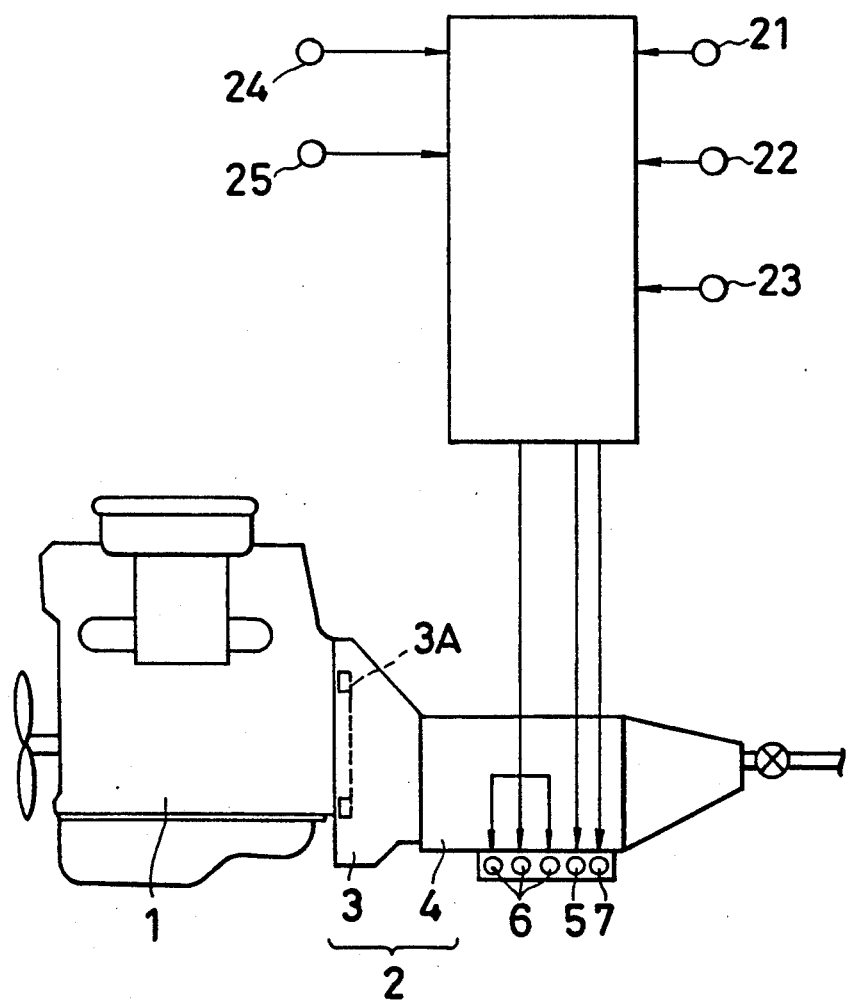
FIG. 1, is a diagrammatical illustration of an outline of a shift control system according to an embodiment of the present invention.

As shown in FIG. 1, output of an engine 1 is transmitted through an automatic transmission 2 to driven wheels (not shown). The automatic transmission 2 comprises a torque converter 3 having a lockup clutch 3A and a multiple stage gear mechanism 4 coupled to a turbine of the torque converter 3.

The multiple stage gear mechanism 4 comprises a planetary geartrain as is known to the art to which the present invention pertains. In this embodiment, the geartrain has four forward speed ranges and one rearward speed range. The multiple stage gear mechanism 4 is designed to shift a pathway of power transmission, i.e., implements a shift, by changing a combination of coupling or uncoupling a plurality of friction coupling elements of a hydraulic type to or from each other. The shift is implemented by changing a combination of energizing a plurality of solenoids 6 incorporated into a liquid pressure circuit with deenergizing them. Likewise, the lockup clutch 3A is coupled or uncoupled by shifting between energization of the solenoid 5 incorporated into the hydraulic pressure circuit and deenergization thereof. By controlling a duty solenoid 7 incorporated in the hydraulic pressure circuit, the magnitude of a hydraulic pressure to be fed to the friction coupling element and the lockup clutch 3A, i.e., a line pressure, is changed.

Figure 2:
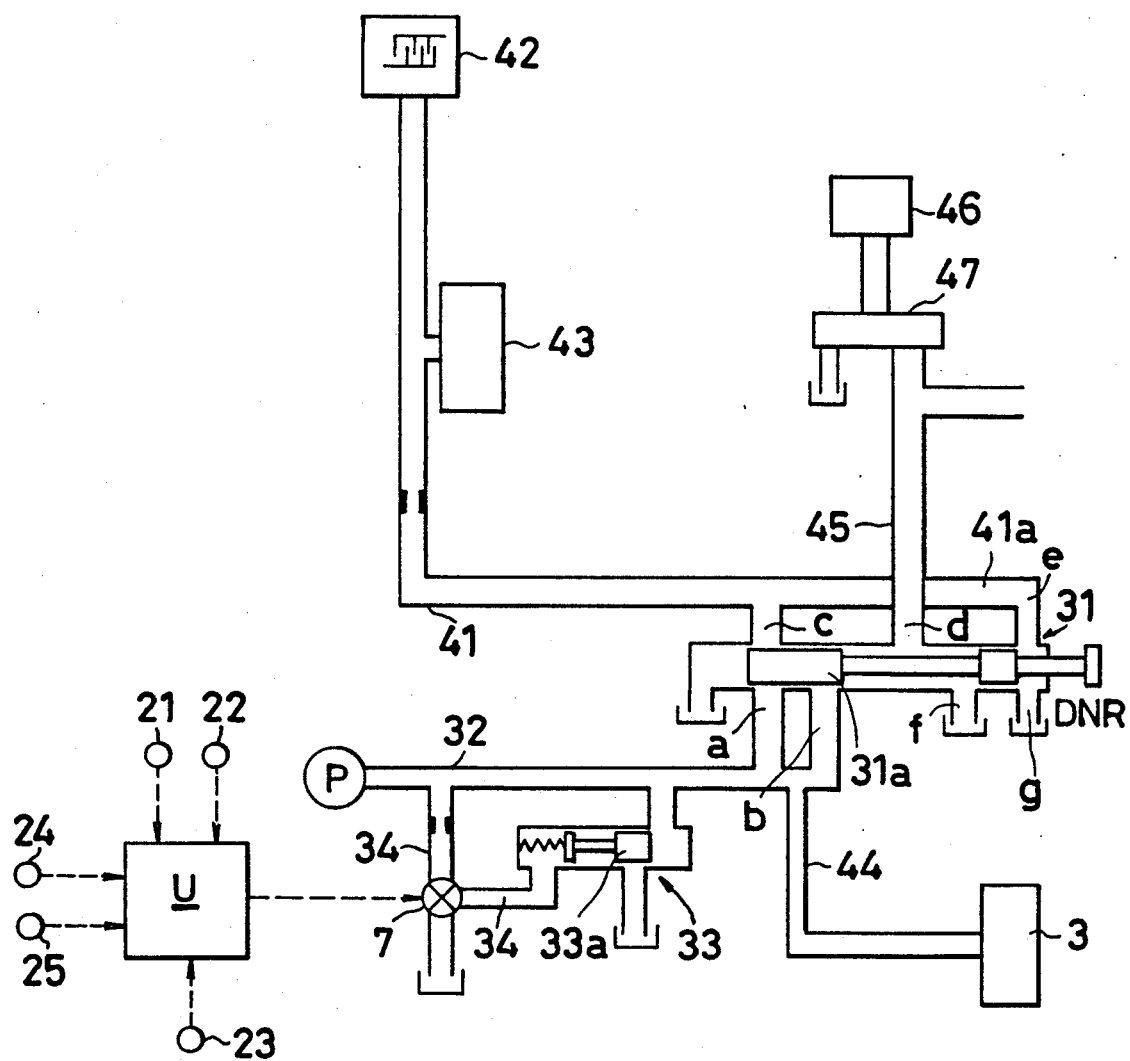
FIG. 2 is a schematic diagram of a hydraulic pressure circuit of the automatic transmission.

As shown in FIG. 2, reference numeral 31 denotes a manual valve to operated manually, and at least speed ranges D, N and R can be provided by displacing a spool 31a of the manual valve 31. The manual valve 31 can be communicated with ports a and b for supplying the line pressure, with ports c, d, and e as well as with drain ports f and g.

Figure 3:
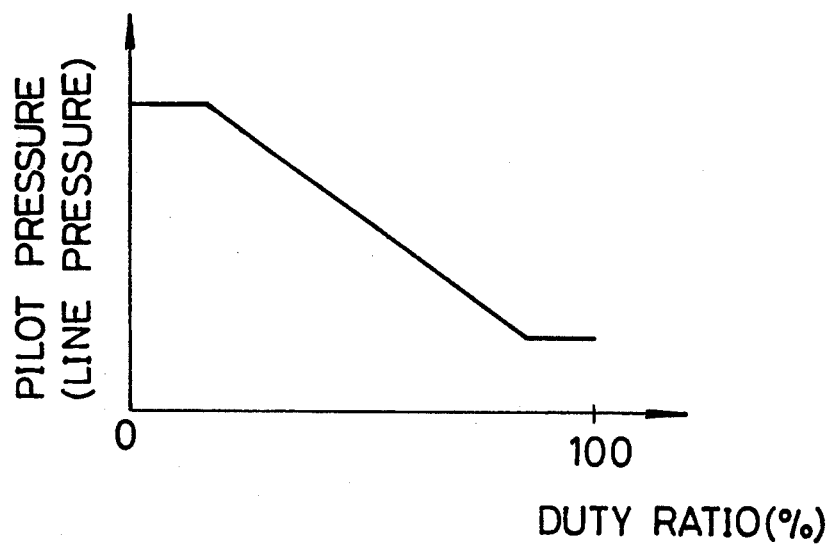
FIG. 3 is a diagram showing the relation of the pilot pressure for adjusting the line pressure versus the duty ratio.

To the ports a and b are connected a passage 32 extending from a pump P as a source of hydraulic pressures, and the pressure in the passage 32 is governed so as to reach a predetermined line pressure by means of a pressure governing valve 33 of a hydraulically operable type. In other words, a drain amount of the passage 32 is adjusted by a position in which a spool 33a of the pressure governing valve 33 is displaced. The pressure governing valve 33 accepts a pilot pressure from a pilot passage 34 branched from the passage 32. The magnitude of the pilot pressure adjusts a drain amount of the pilot passage 34 with the aid of the solenoid 7. More specifically, the pilot pressure is altered in such a manner as shown in FIG. 3 by changing a duty ratio with respect to the solenoid 7. The line pressure from the passage 32 is normally fed to the torque converter 3 through a passage 44.

The line pressure from the port c is coupled with a friction coupling element for rearward driving through a passage 41 which is connected on its halfway to an accumulator 43. A drain passage 41a branched from the passage 41 is communicated with the port e. This allows the port a to be communicated with the port c when the spool 31a of the manual valve 31 is displaced to the rearward speed range R, thereby feeding the line pressure from the port a through the passage 41 to the friction coupling element 42 and providing a rearward speed range. If the spool 31a of the manual valve 31 is displaced to provide a speed range other than the rearward speed range, the port e is communicated with the port g, thereby draining the pressure within the friction coupling element 42 and uncoupling the friction coupling element 42.

When the manual valve 31 is displaced to the speed range D, the port b is communicated with the port d. The line pressure from the port d is normally fed to a friction coupling element (forward clutch) for selecting forward driving, although not shown in the drawing, while it is appropriately fed to a friction coupling element 46 for shifting through a shift valve 47. As shown in FIG. 2, the shift valve 47 serves as a so-called 1-2 shift valve for shifting between first and second speed stages, and a friction coupling element 46 serves as shifting between the first and second speed stages by coupling or uncoupling the shift valve 47. In other words, the line pressure is fed to the friction coupling element 46 by shifting the shift valve 47, thereby coupling the friction coupling element 46, while the pressure within the friction coupling element 46 is drained to thereby uncouple the friction coupling element 46. Such shift valves and friction coupling elements are provided in other positions, thereby enabling a shift of four forward speed ranges as a whole. This point is known to the art so that it is omitted from the drawing. It is a matter of course that the shift valve 47 is designed to shift its shift positions, for example, by switching a mode of supplying the pilot pressure by the solenoid 6.

As shown in FIGS. 1 and 2, a control unit U comprises a microcomputer in which central processing unit, read-only memory (ROM), random access memory (RAM), CLOCK and so on are provided. To the control unit U are provided a vehicle speed signal from a sensor 21, a throttle opening angle signal from a sensor 22, and an oil temperature signal, i.e., an oil for the automatic transmission, from a sensor 23. On top of that, sensors 24 and 25 generate signals to the control unit U and they sense driving load. The sensor 24 senses the gradient of a road surface and the sensor 25 senses a load.

The control unit U is designed to control the line pressure as well as to implement shift control. The shift control is performed by generating an upshifting signal or a downshifting signal to the solenoid 6 on the basis of a predetermined shift characteristic.

Figure 5:
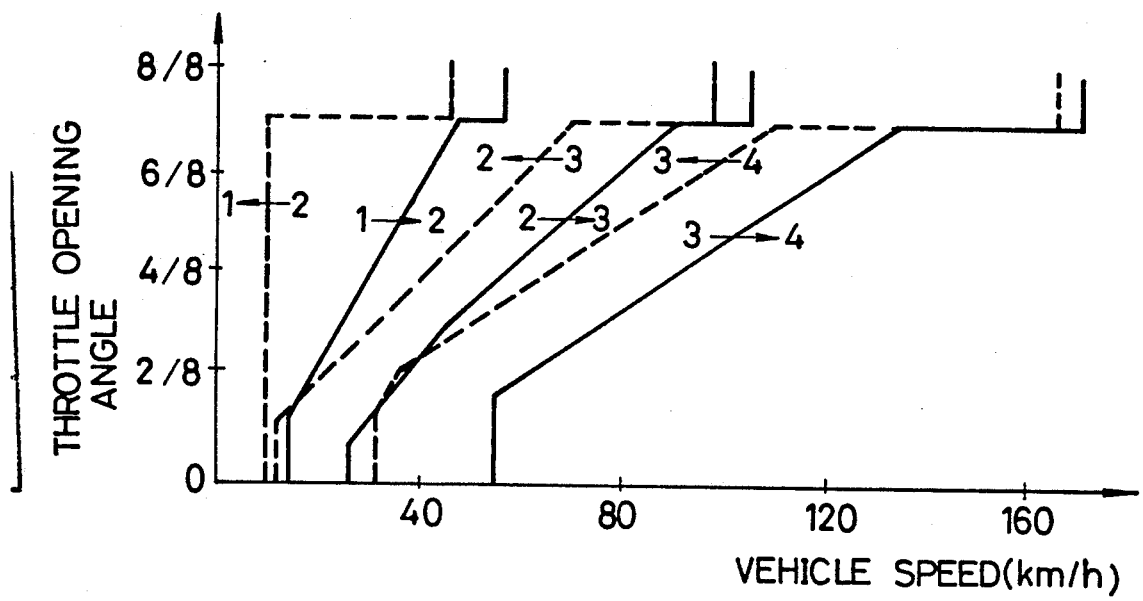
FIG. 5 is a diagram showing the shift characteristic for the normal time period when the oil temperature is not cold.
Figure 6:
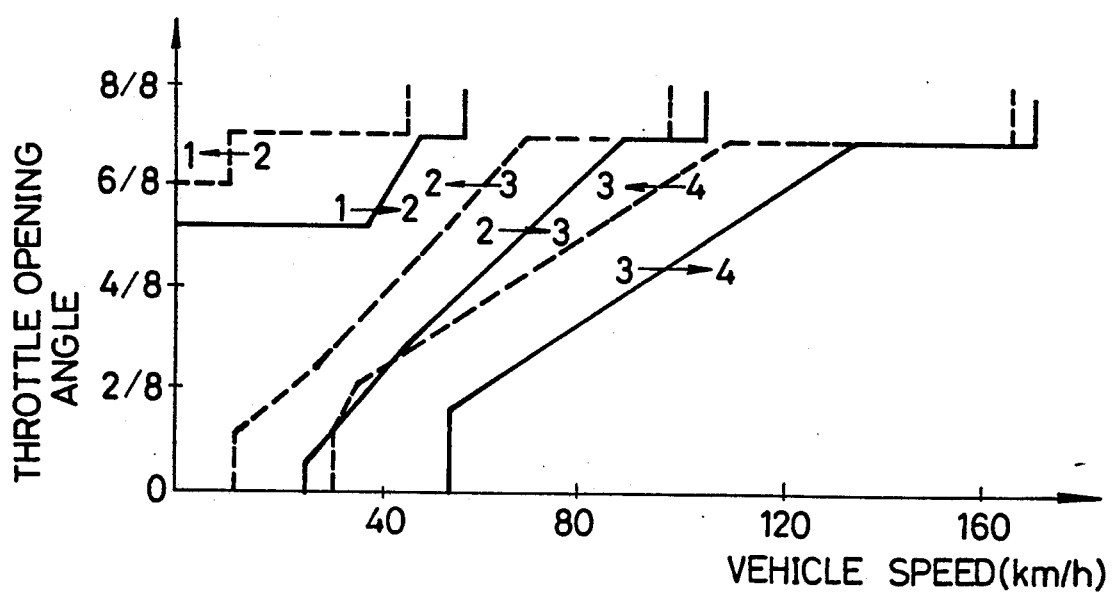
FIGS. 6, 8 and 9 are diagrams showing the shift characteristics for cold time period when the oil temperature is cold.

The shift characteristic comprises two kinds, one being for ordinary time period when the operating oil has a temperature above a given value, as shown in FIG. 5 and the other being for the cold time period when the oil temperature of the operating oil is below the given value, as shown in FIG. 6. Each of the shift characteristics is set using a vehicle speed and a throttle opening angle (the same as an accelerator opening angle) as parameters. The shift characteristic for the ordinary time period as shown in FIG. 5 sets three kinds of shift lines for shifting between first and second speed stages, second and third speed stages, and third and fourth speed stages. The shift characteristic for the cold time period as shown in FIG. 6 has a narrow driving range for the first speed stage as compared with the shift characteristic for the ordinary time period, as shown in FIG. 5. More specifically, for the shift characteristic for the cold time, the shift line for shifting between first and second speed stages is set such that upshifting and downshifting lines are both on the low speed side and it takes the first speed stage only when the throttle opening angle becomes considerably large. It is to be noted herein that each of the shift lines for shifting between second and third speed stages and between third and fourth speed stages may be set to be substantially the same in FIGS. 5 and 6, although they are the same in the embodiment.

The shift characteristic may appropriately be selected from the two kinds of the shift characteristics on the basis of the oil temperature of the operating oil. During the cold time period when the oil temperature is below −10° C., the shift characteristic as shown in FIG. 6 is selected, while the shift characteristic for the ordinary time period as shown in FIG. 5 is selected when the oil temperature exceeds −10° C..

Lockup characteristic for controlling the lockup clutch 3A may be set in a various manner. In this embodiment, the lockup clutch 3A is designed so as to be coupled only when third and fourth speed stages are selected.

Figure 4:
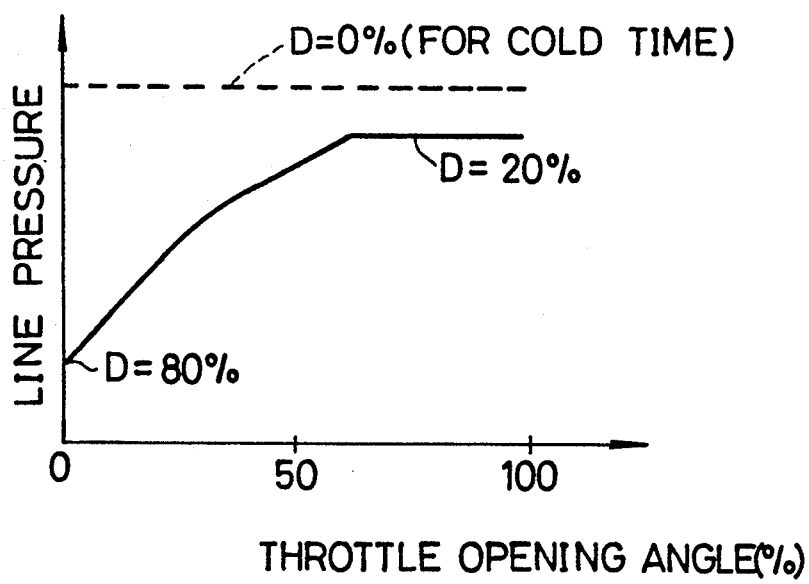
FIG. 4 is a diagram showing the characteristic for setting the line pressure during normal time period when the oil temperature is not cold.

The line pressure is adjusted by means of the control unit U in accordance with the oil temperature. The solid line in FIG. 4 indicates a basic duty ratio with respect to the solenoid 7 for adjusting the line pressure. In this embodiment, the pilot pressure for determining the line pressure is set by using the throttle opening angle as a parameter. The characteristic indicated by the solid line in FIG. 4 is for the ordinary time period and is selected during the non-cold time when the oil temperature exceeds −10° C. At this time, it is possible to correct the basic duty ratio in accordance with the oil temperature of the operating oil. When the oil temperature becomes below −10° C., on the other hand, the duty ratio with respect to the solenoid 7 is uniformly set to 0% without following the characteristic indicated by the solid line in FIG. 4, thereby allowing the line pressure to become the largest as indicated by the broken line in FIG. 4, during the cold time.

The shift characteristics and the basic duty ratio as shown in FIG. 4 are stored in the ROM in the control unit U.

Figure 7:
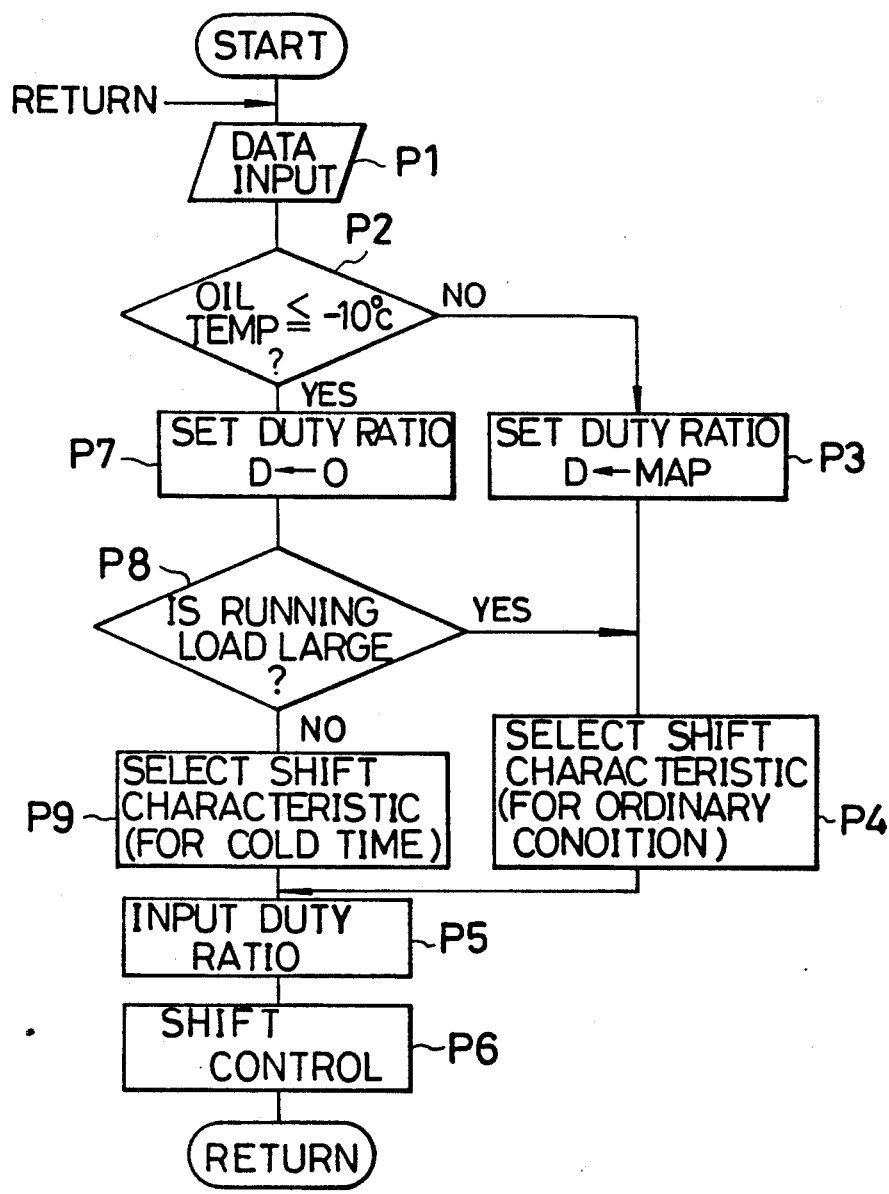
FIG. 7 is a flow chart showing a control example according to the present invention.

Description will now be made of the flow chart as shown in FIG. 7, which represents the control content by the control unit U.

At step P1, the vehicle speed, the throttle opening angle, the oil temperature and the load are read. Then at step P2, it is judged whether the current oil temperature is below −10° C.

When it is decided at step P2 that the oil temperature does not exceed −10° C., on the one hand, the duty ratio D is decided at step P3 with respect to the solenoid 7 for adjusting the line pressure on the basis of the basic characteristic indicated by the solid line in FIG. 4. Then at step P4, the shift characteristic for the ordinary time period as shown in FIG. 5 is selected. Thereafter, the duty ratio D is generated into the solenoid 7 and, at step P6, the shift control is implemented on the basis of the shift characteristics selected, i.e., upshifting signals and downshifting signals are generated.

When it is decided at step P2 that the oil temperature exceeds −10° C., on the other hand, the duty ratio with respect to the solenoid 7 is set to 0% at step P7. Thereafter, at step P8, it is judged whether the driving load of the vehicle is large on the basis of output from the sensors 24 and 25—more specifically, ether of whether the vehicle is running on an up-hill road in which the gradient of the road surface is larger than a given value or whether the load is larger than a given value is satisfied. If NO at step P8, on the one hand, the shift characteristic for the cold time period as shown in FIG. 6 is selected at step P9 and then the processing at steP P5 and thereafter is performed.

When YES at step P8, on the other hand, the flow advances to step P4 and the shift characteristic for ordinary time period as shown in FIG. 5 is selected. The reason for judging at step P8 as described hereinabove is based on the fact that in many occasions the driving at the first speed stage is particularly required when the running load is large.

Figure 8:
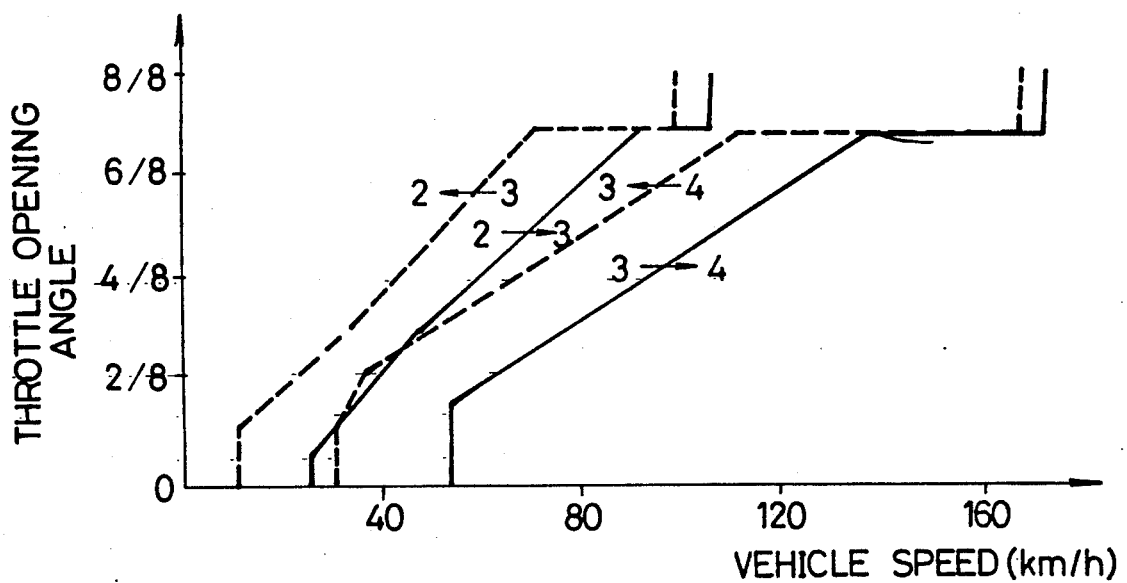
Figure 9:
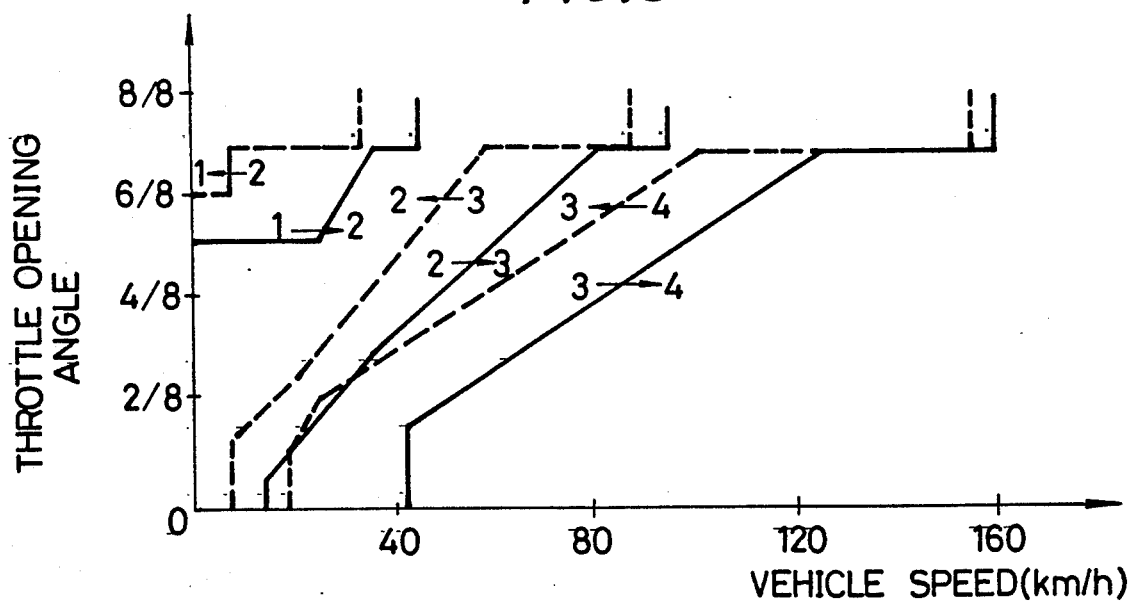
Figure 10:
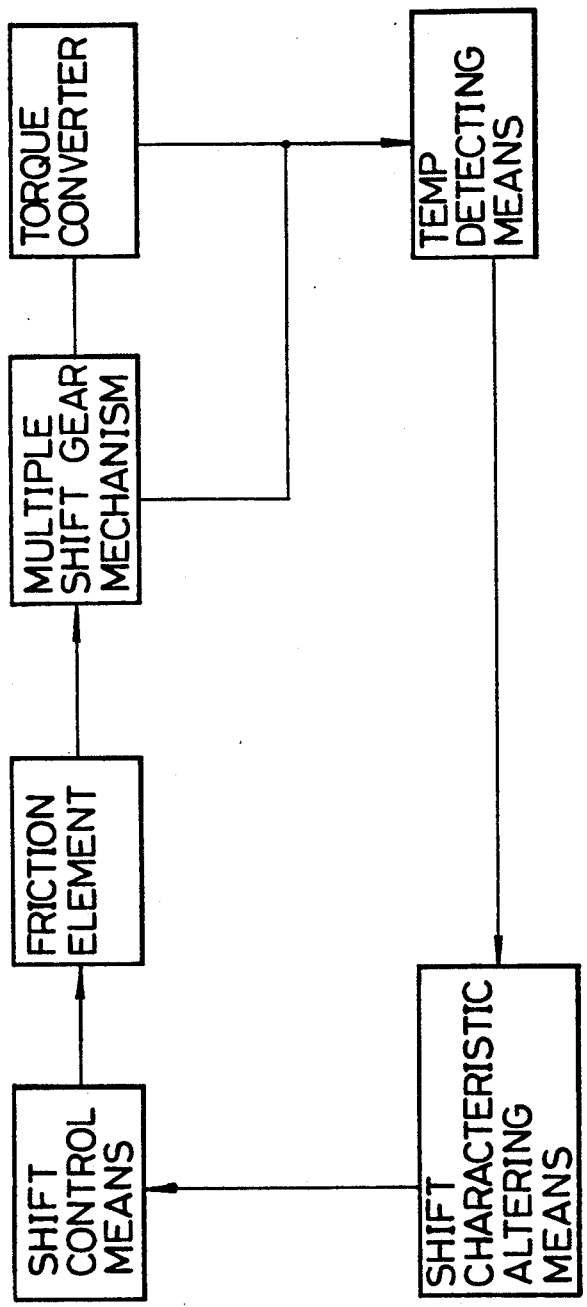
FIG. 10 is a block diagram showing an outline of the construction of the shift control system according to the present invention.

FIGS. 8 and 9 show other shift characteristics to be used for the cold time period when the oil temperature of the operating oil is higher than a predetermined value. FIG. 8 shows the shift characteristic in which there is provided no shift line for shifting between first and second speed stages, namely, in which the range of driving at first speed stage is not set at all. For the shift characteristic as shown in FIG. 8, the shift line for the speed stage higher than the second speed stage (shift line for shifting between second and third speed stages or for shifting between third and fourth speed stages) is set in the same manner as that for the shift characteristic for the ordinary time period as shown in FIG. 5. For the shift characteristic as shown in FIG. 9, the range of driving at first speed stage is set only at lower speed and at higher running load, as compared to that shown in FIG. 5. The shift characteristic as shown in FIG. 9 is such that the shift line for the speed stage on the high speed side higher than the second speed range is set on the lower speed side, as compared with the shift characteristic for ordinary time period as shown in FIG. 5.

It is to be understood that the foregoing text and drawings relate to embodiments of the present invention given by way of examples but not limitation. Various other embodiments and variants are possible within the spirit of the present invention.

What is claimed is:

1. A shift control system for an automatic transmission, comprising:
   a torque converter;
   a multiple stage gear mechanism for performing a shift by shifting an operational state of a friction coupling element of a hydraulic pressure type, which is coupled to the torque converter;
   a shift control means for controlling operation of the friction coupling element on the basis of a predetermined shift characteristic;
   a temperature detecting means for detecting a temperature of an operating oil for the torque converter and the friction coupling element; and
   a shift characteristic shifting means for shifting the shift characteristic so as to make a range of driving at least at a first speed stage narrow during a cold time period when the temperature of the operating oil detected by the temperature detecting means is equal to or lower than a predetermined value.

2. A shift control system as claimed in claim 1, further comprising a pressure raising means for raising a line pressure of the operating oil during the cold time period.

3. A shift control system as claimed in claim 2, further comprising a basic line pressure control means for controlling the line pressure in accordance with an engine load;
   wherein a magnitude of the line pressure to be elevated by the line pressure raising means is set to be greater than a maximum line pressure to be provided by the basic line pressure control means.

4. A shift control system as claimed in claim 2, further comprising a solenoid valve for adjusting a line pressure and a basic line pressure control means for controlling the solenoid valve by a predetermined control value set by using an engine load as a parameter;

wherein the pressure raising means sets a control value for the solenoid valve so as for a line pressure to become greater than a maximum line pressure to be provided by the basic line pressure control means, prior to the basic line pressure control means.

5. A shift control system as claimed in claim 4, wherein the control value for the solenoid valve is set as a duty ratio.

6. A shift control system as claimed in claim 4, further comprising:

a pump as a source of generating a hydraulic pressure;

a manual valve for shifting a speed range position, which is interposed among the torque converter, the pump and the friction coupling element;

a pressure governing valve of a hydraulic pressure type connected to an oil passage interposed between the pump and the manual valve; and a pilot passage for supplying a pilot pressure for controlling the pressure governing valve to the pressure governing valve;

wherein the solenoid valve is such as to adjust the pilot pressure, which is connected to the pilot passage.

7. A shift control system as claimed in claim 4, wherein the control value by the basic line pressure control means is set so as for the line pressure to become greater as the engine load becomes greater.

8. A shift control system as claimed in claim 1, wherein the shift characteristic for the cold time period is set to narrow the range of driving at the first stage so as to have no first speed stage.

9. A shift control system as claimed in claim 1, wherein the shift characteristic for the cold time period is set such that a range of driving at first speed stage is on the side of a lower speed and a higher load, as compared to the shift characteristic for a time period other than the cold time period.

10. A shift control system as claimed in claim 1, wherein the shift characteristic for the cold time period is set such that a range of driving at a speed stage on a high speed side as high as or higher than a second speed stage is set on the side of a lower speed stage, as compared to the shift characteristic for a time period other than the cold time period.

11. A shift control system as claimed in claim 1, wherein both the shift characteristic for the time period when the operating oil is cold and the shift characteristic for the time period when the operating oil is not cold are set substantially identical to each other in the area of driving at a speed stage on the side as high as or higher than a second speed stage.

12. A shift control system as claimed in claim 1, wherein the shift characteristic for the time period when the operating oil is cold is set such that the area of driving at first speed stage is located on the side of a speed stage slower than and of a running load higher than the shift characteristic for the time period when the operating oil is not cold; and wherein both the shift characteristic for the time period when the operating oil is cold and the shift characteristic for the time period when the operating oil is not cold are set substantially identical to each other in the area of driving at a speed stage on the side as high as or higher than the second speed stage.

13. A shift control system as claimed in claim 1, wherein the shift characteristic for the time period when the operating oil is cold is set so as for the speed stage to have no first speed stage; and wherein both the shift characteristic for the time period when the operating oil is cold and the shift characteristic for the time period when the operating oil is not cold are set substantially identical to each other in the area of driving at a speed stage on the side as high as or higher than the second speed stage.

14. A shift control system as claimed in claim 1, wherein the shift characteristic for the time period when the operating oil is cold is set such that the area of driving at the first speed stage is located on the side of a speed stage slower than and of a running load higher than the shift characteristic for the time period when the operating oil is not cold and such that the area of driving at a second speed stage or at a speed stage higher than the second speed stage is located on the side of a speed stage slower than the shift characteristic for the time period when the operating oil is not cold.

15. A shift control system as claimed in claim 1, wherein the shift characteristic shifting means comprises:

a shift characteristic storing means for storing a first shift characteristic and a second shift characteristic; wherein the first shift characteristic in which an area of driving for each speed stage ranging from the first speed stage to a highest speed stage is set and the second shift characteristic in which the area for driving at first speed stage is set to be narrower than the first shift characteristic; and a shift characteristic selecting means for selecting the second shift characteristic during the time period when the operating oil is cold and for selecting the first shift characteristic during the time period when the operating oil is not cold, as the shift characteristic to be used by the shift control means, in response to output from the temperature detecting means.

16. A shift control system as claimed in claim 15, wherein each of the first shift characteristic and the second shift characteristic is set using a vehicle speed and an engine load as parameters.

17. A shift control system as claimed in claim 16, wherein the shift characteristic for the time period when the operating oil is cold is set so as to have no first speed stage.

18. A shift control system as claimed in claim 16, wherein the shift characteristic for the time period when the operating oil is cold is set such that the area of driving at first speed stage is located on the side of a speed stage lower than and of a load higher than the shift characteristic for the time period when the operating oil is not cold.

19. A shift control system as claimed in claim 16, wherein the shift characteristic for the time period when the operating oil is cold is set such that the area of driving at the second speed stage or at a speed stage higher than the second speed stage is located on the side of a speed stage slower than the shift characteristic for the time period when the operating oil is not cold.

20. A shift control system as claimed in claim 16, wherein both the shift characteristic for the time period when the operating oil is cold and the shift characteristic for the time period when the operating oil is not cold are set substantially identical to each other in the area of driving at second speed stage or at a speed stage higher than the second speed stage.

21. A shift control system as claimed in claim 16, wherein the shift characteristic for the time period when the operating oil is cold is set such that the area of driving at the first speed stage is located on the side of a speed stage slower than and of a running load higher than the shift characteristic for the time period when the operating oil is not cold; and wherein both the shift characteristic for the time period when the operating oil is cold and the shift characteristic for the time period when the operating oil is not cold are set substantially identical to each other in the area of driving at second speed stage or at a speed stage higher than the second speed stage.

22. A shift control system as claimed in claim 16, wherein the shift characteristic for the time period when the operating oil is cold is set so as to have no first speed stage; and wherein both the shift characteristic for the time period when the operating oil is cold and the shift characteristic for the time period when the operating oil is not cold are set substantially identical to each other in the area of driving at second speed stage or at a speed stage higher than the second speed stage.

23. A shift control system as claimed in claim 16, wherein the shift characteristic for the time period when the operating oil is cold is set such that the area of driving at the first speed stage is located on the side of a speed stage slower than and of a running load higher than the shift characteristic for the time period when the operating oil is not cold and such that the area of driving at the second speed stage or at a speed stage higher than the second speed stage is locted on the side of a speed stage slower than the shift characteristic for the time period when the operating oil is not cold.

24. A shift control system as claimed in claim 1, further comprising:

a running load detecting means for detecting a running load of the vehicle; and an inhibition means for inhibiting a shift to the shift characteristic for the time period when the operating oil is cold by means of the shift characteristic shifting means when the running load detected by the running load detecting means is greater than a predetermined value.

25. A shift control system as claimed in claim 24, wherein the running load detecting means is to detect the running load on the basis of at least one of a gradient of a road surface and a load.

* * * * *